United States Patent [19]

Kaneko et al.

[11] Patent Number: 5,789,556
[45] Date of Patent: Aug. 4, 1998

[54] DICHROIC DYE, AND LIQUID-CRYSTAL COMPOSITION AND LIQUID-CRYSTAL DISPLAY ELEMENT CONTAINING THE DYE

[75] Inventors: Masaharu Kaneko; Tomio Yoneyama; Masami Kadowaki, all of Kanagawa, Japan

[73] Assignee: Mitsubishi Chemical Corporation, Tokyo, Japan

[21] Appl. No.: 836,065

[22] PCT Filed: Aug. 20, 1996

[86] PCT No.: PCT/JP96/02316

§ 371 Date: Apr. 18, 1997

§ 102(e) Date: Apr. 18, 1997

[87] PCT Pub. No.: WO97/07184

PCT Pub. Date: Feb. 27, 1997

[30] Foreign Application Priority Data

Aug. 21, 1995 [JP] Japan .................. 7-211760

[51] Int. Cl.⁶ .................. C09B 35/56; C09K 19/12; C09K 19/32; C09K 19/34
[52] U.S. Cl. .................. 534/577; 252/299.61; 252/299.62; 252/299.63; 252/299.66; 349/182
[58] Field of Search .................. 534/577; 252/299.61, 252/299.62, 299.63, 299.66

[56] References Cited

U.S. PATENT DOCUMENTS

| | | | |
|---|---|---|---|
| 4,519,935 | 5/1985 | Claussen | 252/299.1 |
| 4,610,803 | 9/1986 | Claussen | 252/299.1 |
| 4,770,809 | 9/1988 | Heidenreich et al. | 252/299.1 |
| 5,536,818 | 7/1996 | Kaneko et al. | 534/577 |

FOREIGN PATENT DOCUMENTS

| | | |
|---|---|---|
| 59-109576 | 6/1984 | Japan . |
| 7-179858 | 7/1995 | Japan . |
| 8-67825 | 3/1996 | Japan . |

*Primary Examiner*—Fiona T. Powers
*Attorney, Agent, or Firm*—Sughrue, Mion, Zinn, Macpeak & Seas, PLLC

[57] ABSTRACT

A dichroic azo dye characterized by having a trifluoromethyl-substituted biphenyl framework and being represented by the following general formula, and a guest-host liquid-crystal composition and a liquid-crystal display element each containing the same and having a high order parameter throughout the whole light absorption wavelength range, are provided:

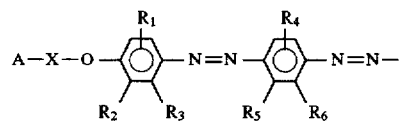
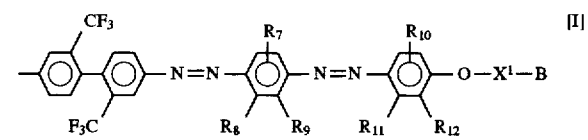

(wherein A and B each independently represents an optionally substituted alkyl group, phenyl group or cyclohexyl group; X and $X^1$ each independently represents a methylene group or a carbonyl group; and $R_1$ to $R_{12}$ each independently represents a hydrogen atom, a halogen atom, a methyl group or a methoxy group, or $R_2$ and $R_3$, $R_5$ and $R_6$, $R_8$ and $R_9$, and $R_{11}$ and $R_{12}$ may be bonded to each other to form an aliphatic, aromatic or nitrogenous aromatic ring which is a five-membered or larger-membered ring).

7 Claims, 3 Drawing Sheets

DICHROIC DYE, AND LIQUID-CRYSTAL COMPOSITION AND LIQUID-CRYSTAL DISPLAY ELEMENT CONTAINING THE DYE

This application is a 371 of PCT/JP96/02316 filed Aug. 20, 1996.

TECHNICAL FIELD

The present invention relates to a novel yellow dichroic azo dye, a liquid-crystal composition containing the same, and a liquid-crystal display element using the same.

BACKGROUND ART

Various display modes for liquid-crystal display elements have been proposed so far, besides the twisted nematic (TN) display mode, the super-twisted nematic (STN) mode, and the like. Among those, the guest-host (GH) display mode which employs a dye dissolved in a liquid crystal is currently widely used in automotive and other display panels because of characteristics thereof such as a wide viewing angle and brightness, and is receiving attention because of its suitability for, e.g., reflection type displays for use in portable information apparatus.

Dyes for use in the GH mode are required to be excellent in 1) dichroism,
2) solubility,
3) light resistance, and
4) coloring power.

Since dye dichroism or order parameter, among those properties, directly correlates with the display qualities, such as contrast, of guest-host liquid-crystal display elements, there has hitherto been required a guest-host type liquid-crystal composition having a high order parameter. In particular, a guest-host liquid-crystal composition having a high order parameter which comprises a new host liquid-crystal composition such as a fluorinated one and which can be used in active-matrix operation type LCDs and the like is recently required.

Azo dyes having a biphenyl framework are advantageous in that they have a high extinction coefficient (coloring power), and that since azo structures can be simultaneously incorporated respectively on both sides of the biphenyl framework, the cost of the production thereof is low and a dye having a large molecular length so as to be suitable for use with liquid crystals can be easily produced. In U.S. Pat. No. 4,610,803 there are shown various dichroic trisazo dyes including the dyes of the structures shown below, which are given therein in Examples 2 and 3, as specific examples of yellow dichroic dyes having an azo group on each side of a biphenyl framework.

Example 2 a)

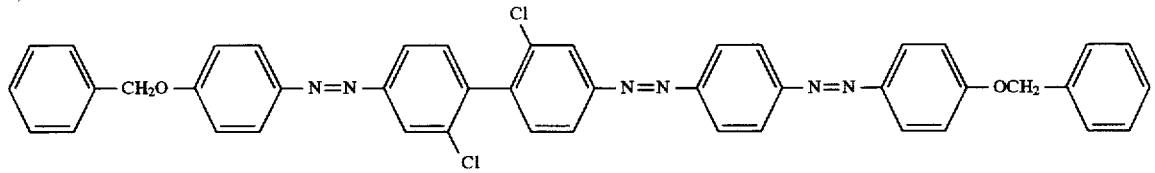

Example 3 c)

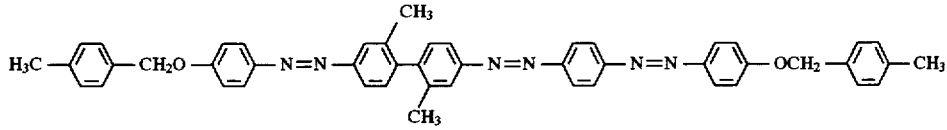

However, such azo dyes having a biphenyl framework have had considerable limitations on the production and use thereof because of the high toxicity (carcinogenicity and mutagenicity) of the benzidine compounds used as starting materials therefor.

On the other hand, guest-host liquid-crystal compositions each comprising a mixture of a host liquid crystal and a single dichroic dye have had a problem that because of the structure, etc., of the dichroic dye used, the order parameter thereof is not constant throughout the whole light absorption region and often decreases in a light absorption wavelength range apart from the main absorption wavelength ($\lambda_{max}$). This problem has led to the phenomenon in which a guest-host liquid-crystal composition containing various dichroic dyes in combination so as to have hues such as black, brown and dark blue has a reduced order parameter in the wavelength spectral range where light absorption by the individual dichroic dyes overlaps, and the reduced order parameter renders the whole liquid-crystal composition to have insufficient contrast. Such a phenomenon is noticeable when dichroic azo dyes having a wide light absorption wavelength range are used. Because of this, a guest-host liquid-crystal composition having a high order parameter has been difficult to realize.

DISCLOSURE OF THE INVENTION

An object of the present invention is (1) to provide a dichroic dye which is reduced in the drawbacks described above and is excellent in structural safety and dichroism. Another object of the present invention is (2) to provide, using the dye, a guest-host liquid-crystal composition and a liquid-crystal display element, which have hues such as black, brown, dark blue, etc., and having a high order parameter throughout the whole light absorption wavelength range.

As a result of extensive studies made by the present inventors in view of subject (1) described above, they have found that a tetrakisazo dye synthesized from 2,2'-ditrifluoromethylbenzidine, which singularly shows no mutagenicity despite the fact that it is a benzidine compound, and a phenolic coupling ingredient is a yellow dye which is highly safe and has exceedingly high dichroism and which is superior in dichroism to the trisazo dyes described in U.S. Pat. No. 4,610,803, cited hereinabove. The present invention has been completed based on this finding.

An essential point of the present invention resides in a dichroic azo dye which has a trifluoromethyl-substituted biphenyl framework and is represented by the following general formula [I]:

FIG. 3 is a plot of absorbance (relative value) versus wavelength (nm) for the cell fabricated in Example 23. (GH liquid-crystal composition 3).

As a result of extensive investigations further made by the present inventors in view of subject (2) described above, they have found that when the above yellow dye having a biphenyl framework is used in combination with dichroic dyes each having a specific structure to prepare a guest-host liquid-crystal composition having hues such as black, brown and dark brown, this composition has a high order parameter throughout the whole light absorption wavelength range. Accordingly, the second essential point of the present invention resides in a guest-host liquid-crystal composition and a liquid-crystal display element comprising the guest-host liquid-crystal composition, which contain at least one dichroic azo dye represented by general formula [I] described above, which are characterized in that they contain at least one dye selected from Group (A) shown below at least one dye selected from Group (B) shown below, and at least one dye selected from Group (C) shown below:

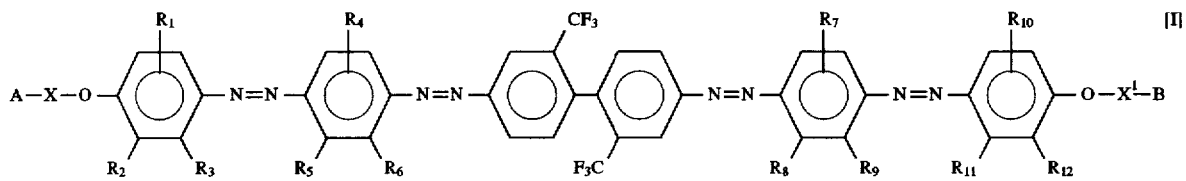

(wherein A and B each independently represents an optionally substituted alkyl group, phenyl group or cyclohexyl group; X and $X^1$ each independently represents a methylene group or a carbonyl group; and $R_1$ to $R_{12}$ each independently represents a hydrogen atom, a halogen atom, a methyl group or a methoxy group, or $R_2$ and $R_3$, $R_5$ and $R_6$, $R_8$ and $R_9$, and $R_{11}$ and $R_{12}$ may be bonded to each other to form an aliphatic, aromatic or nitrogenous aromatic ring which is a five-membered or larger membered ring).

Group (A)

Figure 1:
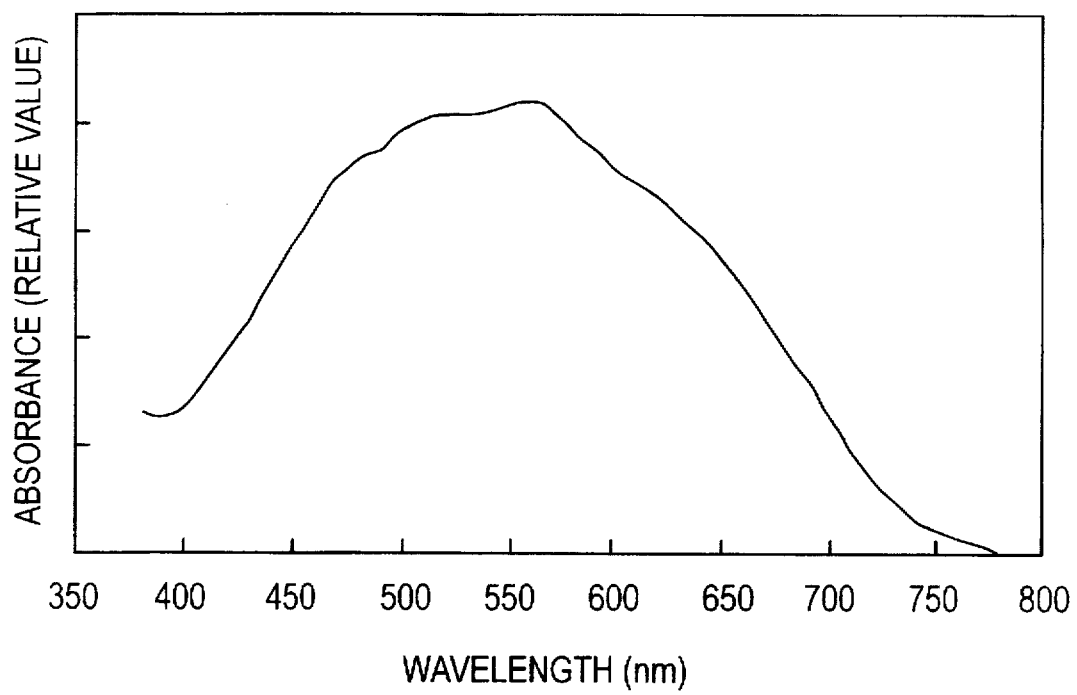
FIG. 1 is a plot of absorbance (relative value) versus wavelength (nm) for the cell fabricated in Example 21. (GH liquid-crystal composition 1).

dichroic azo dyes represented by general formula [I] described above;

Group (B)

dichroic azo dyes having a trifluoromethyl-substituted biphenyl framework and represented by the following general formulae [II] and [III]:

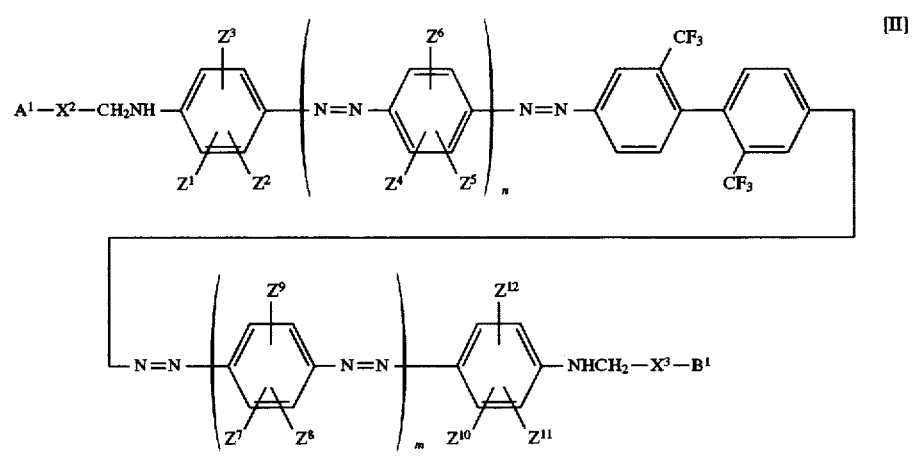

(wherein $A^1$ and $B^1$ each represents a hydrogen atom or a nonionic substituent; $X^2$ and $X^3$ each represents

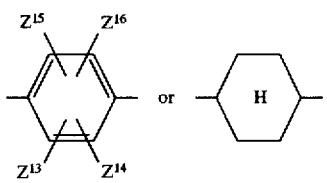 or $Z^1$ to $Z^{16}$ each represents a hydrogen atom, a halogen atom, a methyl group or a methoxy group, or $Z^1$ and $Z^2$, $Z^4$ and $Z^5$, $Z^7$ and $Z^8$, $Z^{10}$ and $Z^{11}$, and $Z^{13}$ and $Z^{14}$ are bonded to each other to form an aliphatic, aromatic or nitrogenous aromatic ring which is a five-member or larger-membered ring; and m and n each represents a number of 0 to 2);

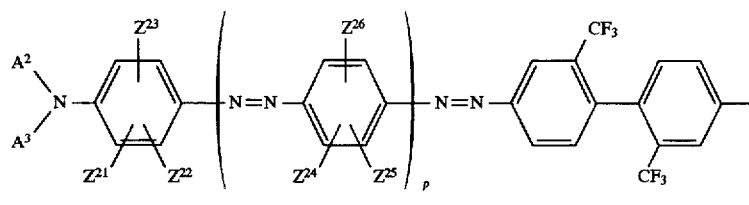

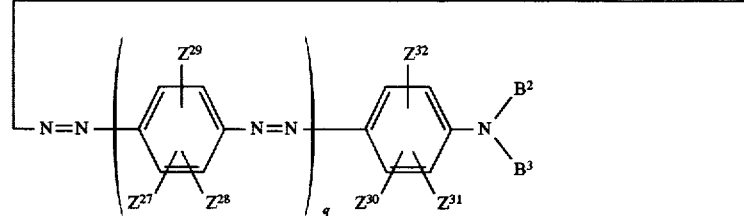

[wherein $A^2$, $A^3$, $B^2$ and $B^3$ each represents a hydrogen atom, an alkyl group, an alkoxyalkyl group, an optionally substituted aralkyl group, or a fluoroalkyl-substituted alkyl group, or $A^2$ and $A^3$ are bonded to each other and $B^2$ and $B^3$ are bonded to each other to thereby each form a five-membered or larger-membered nitrogenous aliphatic ring; $Z^{21}$ to $Z^{32}$ each represents a hydrogen atom, a halogen atom, a methyl group or a methoxy group, or $Z^{21}$ and $Z^{22}$, $Z^{24}$ and $Z^{25}$, $Z^{27}$ and $Z^{28}$, and $Z^{30}$ and $Z^{31}$ are bonded to each other to form an aliphatic, aromatic or nitrogenous aromatic ring which is a five-membered or larger-membered ring; or $A^2$ and $Z^{23}$, $A^3$ and $Z^{21}$, $B^2$ and $Z^{32}$, and $B^3$ and $Z^{31}$ are bonded to each other to form a five-membered or large -membered nitrogenous aliphatic ring; and p and q each represents a number of 0 to 2 (provided that the case where both p and q are 0 is excluded)];

Group (C)

dichroic azo dyes represented by the following general formula [IV] and dichroic anthraquinone dyes represented by the following general formula [V]:

(wherein —$X^4$— represents a single bond, —OCO— or —S—; $A^4$ represents a hydrogen atom, an alkyl or alkoxy group having 1 to 10 carbon atoms, an alkoxyalkyl group having 2 to 12 carbon atoms, a halogen atom, a haloalkyl group, a haloalkoxy group, a haloalkoxyalkyl group, or a phenyl, cyclohexylphenyl or benzyl group optionally having a substituent selected from these alkyl, alkoxy and alkoxyalkyl groups; and $B^4$ represents a hydrogen atom, an alkyl or alkoxy group having 1 to 10 carbon atoms, an alkoxyalkyl group having 2 to 12 carbon atoms, a halogen atom, e.g., a fluorine or chlorine atom, or a cyclohexyl, phenyl, benzyl or cyclohexylmethyl group optionally having a substituent selected from these alkyl, alkoxy and alkoxyalkyl groups and halogen atoms);

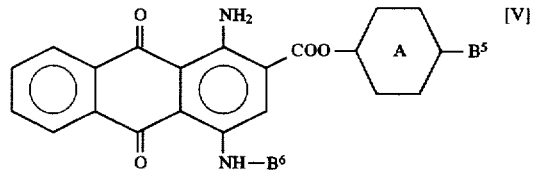

(wherein

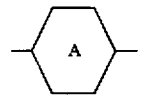

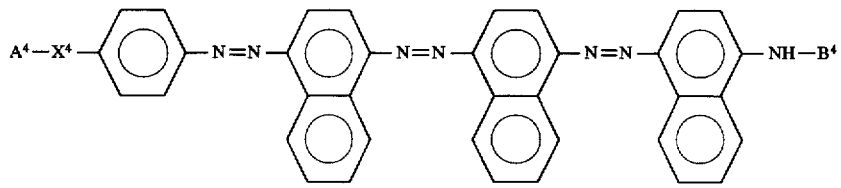

represents

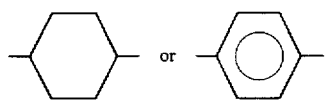

and $B^5$ and $B^6$ each independently represents a hydrogen atom, a halogen atom, a line or branched alkyl or alkoxy group having 1 to 10 carbon atoms, a linear or branched alkoxyalkyl group having 2 to 12 carbon atoms, or a cyclohexyl or phenyl group optionally having a substituent selected from these alkyl, alkoxy and alkoxyalkyl groups).

The azo dye represented by general formula [I], which has a trifluoromethyl-substituted biphenyl framework, can be synthesized as follows. 2,2'-Ditrifluoromethylbenzidine is subjected to a known diazotizing coupling reaction with compounds [VI] and [VII] shown below (in the formulae, $R_4$ to $R_9$ have the same meanings as those in general formula [I] given above, and $R_{13}$ and $R_{14}$ represent a hydrogen atom or —$CH_2SO_3Na$). In the case where $R_{13}$ and $R_{14}$ are —$CH_2SO_3Na$, the coupling reaction product is hydrolyzed. Thus, a compound represented by the following general formula [VIII] (wherein $R_4$ to $R_9$ have the same meanings as those in general formula [I] given above) is obtained. Subsequently, this compound represented by general formula [VIII] is reacted with a phenolic coupler by diazotizing coupling reaction to obtain a compound represented by the following general formula [IX] (wherein $R_1$ to $R_{12}$ have the same meanings as in general formula [I] given above). This compound is then etherified or esterified at both ends thereof by a known method to incorporate the groups A—X— and —$X^1$—B to thereby obtain the objective dye.

MODES FOR CARRYING OUT THE INVENTION

In general formula [I] given above, A and B each independently is preferably an alkyl group having 1 to 8 carbon atoms, a phenyl group, a cyclohexyl group, or a cycloalkyl or phenyl group substituted with a halogen atom, a trifluoromethyl group, a trifluoromethoxy group, an alkyl group, an alkoxy group, an alkoxyalkyl group, an optionally substituted cycloalkyl or phenyl group.

Preferably, A and B each independently represents a phenyl or cyclohexyl group substituted with a substituent selected from alkyl groups such as lower alkyl groups (having, e.g., 1 to 4 carbon atoms), alkoxy groups such as alkoxy groups having 1 to 4 carbon atoms, alkoxyalkyl groups such as alkoxyalkyl groups having 2 to 4 carbon atoms, and cyclohexyl and phenyl groups optionally substituted with an alkyl group having not more than 6 carbon atoms.

$R_1$ to $R_{12}$ are defined in accordance with the following (1) and (2).

(1) $R_1$, $R_4$, $R_7$ and $R_{10}$ each independently is selected from a hydrogen atom, halogen atoms, a methyl group and a methoxy group.

Each of them preferably is a hydrogen atom.

(2) $R_2$, $R_3$, $R_5$, $R_6$, $R_8$, $R_9$, $R_{11}$ and $R_{12}$ each independently is selected from a hydrogen atom, halogen atoms, a methyl group and a methoxy group as in (1) above; or $R_2$ and $R_3$, $R_5$ and $R_6$, $R_8$ and $R_9$, and $R_{11}$ and $R_{12}$ are bonded to each other to form an aliphatic, aromatic, or nitrogenous aromatic ring which is a five-membered or larger-membered ring.

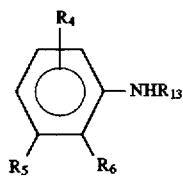

[VI]

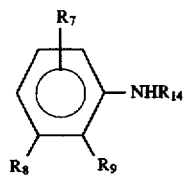

[VII]

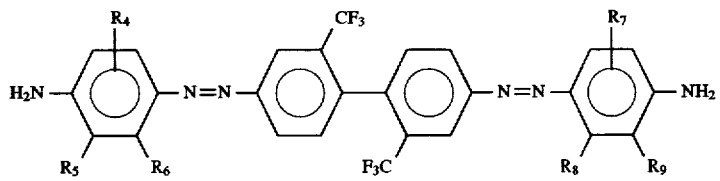

[VIII]

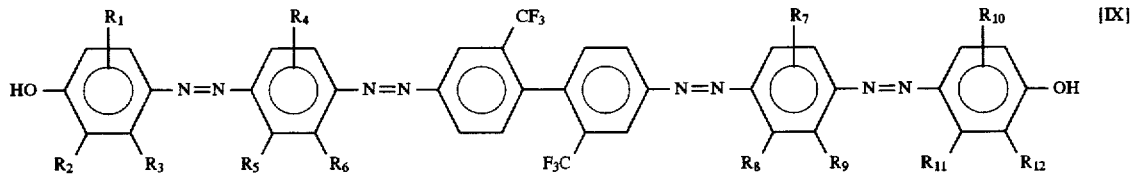

[IX]

In the case where $R_2$ and $R_3$, $R_5$ and $R_6$, $R_8$ and $R_9$, and $R_{11}$ and $R_{12}$ each form a ring, this ring is preferably a five-membered or larger-membered ring from the standpoint of structural stability, and most desirably constitutes a part of a tetralin, naphthalene or quinoline ring.

The rings which are formed by $R_2$ and $R_3$, $R_5$ and $R_6$, $R_8$ and $R_9$, and $R_{11}$ and $R_{12}$ bonded to each other may be substituted. Preferred substituents are alkyl groups, alkoxy groups and halogen atoms. More preferred substituents are alkyl groups having 1 to 4 carbon atoms, alkoxy groups having 1 to 4 carbon atoms, a chlorine atom, and a bromine atom. Most preferred substituents are alkyl groups having 1 to 4 carbon atoms.

Specific examples of the dye represented by general formula [I] are shown in Table 1.

In Compound I-10 given in Table 1, the nitrogen atom of each of the quinoline ring formed by $R_5$ and $R_6$ and that formed by $R_8$ and $R_9$ is located apart from the biphenyl structure as shown below.

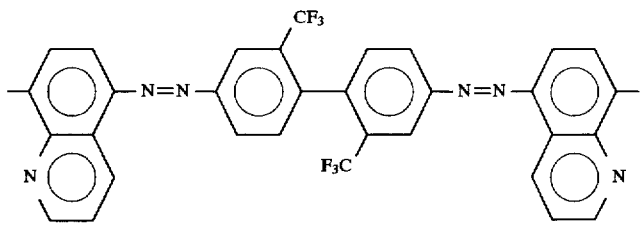

TABLE 1

| Structural formula | A | X | R¹ | R⁴ | R⁵ | R⁶ | R⁷ | R⁸ | R⁹ | R¹¹ | X¹ | B |
|---|---|---|---|---|---|---|---|---|---|---|---|---|
| I-1 | –⟨⟩–CH₃ | –CH₂– | CH₃ | CH₃ | H | H | H | CH₃ | H | CH₃ | –CH₂– | –⟨⟩–CH₃ |
| I-2 | –⟨⟩–C₅H₁₁(n) | –CH₂– | CH₃ | CH₃ | H | H | H | CH₃ | H | CH₃ | –CH₂– | –⟨⟩–C₅H₁₁(n) |
| I-3 | –⟨⟩–C₅H₁₁(n) | –CH₂– | H | H | bonded to form part of naphthalene ring | H | H | bonded to form part of naphthalene ring | H | H | –CH₂– | –⟨⟩–C₅H₁₁(n) |
| I-4 | –⟨⟩–⟨H⟩ | –CO– | H | H | H | H | H | H | H | H | –CO– | –⟨⟩–⟨H⟩ |
| I-5 | –⟨⟩–OC₄H₉(n) | –CH₂– | H | CH₃ | H | H | H | CH₃ | H | H | –CH₂– | –⟨⟩–OC₄H₉(n) |
| I-6 | –⟨⟩–C₃H₇(n) | –CH₂– | H | Cl | H | H | H | Cl | H | H | –CH₂– | –⟨⟩–C₃H₇(n) |
| I-7 | –⟨H⟩–C₅H₁₁(n) | –CH₂– | H | H | H | H | H | H | H | H | –CH₂– | –⟨H⟩–C₅H₁₁(n) |
| I-8 | –⟨⟩–C₅H₁₁(n) | –CH₂– | H | CH₃ | CH₃ | H | CH₃ | CH₃ | H | H | –CH₂– | –⟨⟩–C₅H₁₁(n) |
| I-9 | –⟨⟩–C₂H₄–O–CH₃ | –CH₂– | H | CH₃ | H | H | H | CH₃ | H | H | –CH₂– | –⟨⟩–C₂H₄–O–CH₃ |
| I-10 | –⟨⟩–C₇H₁₅(n) | –CH₂– | H | H | bonded to form part of quinolene ring | H | H | bonded to form part of quinolene ring | H | H | –CH₂– | –⟨⟩–C₇H₁₅(n) |

TABLE 1-continued

A—X—O—⟨R¹⟩—N=N—⟨R⁴/R⁵R⁶⟩—N=N—⟨CF₃/CF₃⟩—N=N—⟨R⁷/R⁸R⁹⟩—N=N—⟨R¹¹⟩—O—X¹—B

| Structural formula | A | X | R¹ | R⁴ | R⁵ | R⁶ | R⁷ | R⁸ | R⁹ | R¹¹ | X¹ | B |
|---|---|---|---|---|---|---|---|---|---|---|---|---|
| I-11 | ⟨⟩—C₅H₁₁(n) | —CH₂— | H | H | bonded to form part of naphthalene ring | H | | bonded to form part of naphthalene ring | H | H | —CH₂— | ⟨⟩—OC₆H₁₃(n) |
| I-12 | —C₇H₁₅(n) | —CH₂— | H | H | H | H | H | H | H | H | —CH₂— | —C₇H₁₅(n) |
| I-13 | ⟨⟩—CF₃ | —CH₂— | H | CH₃ | H | H | H | CH₃ | H | H | —CH₂— | ⟨⟩—CF₃ |
| I-14 | ⟨⟩—OCF₃ | —CH₂— | H | H | bonded to form part of tetralin ring | H | | bonded to form part of tetralin ring | H | H | —CH₂— | ⟨⟩—OCF₃ |
| I-15 | ⟨⟩—Cl | —CH₂— | H | CH₃ | H | H | H | CH₃ | H | H | —CH₂— | ⟨⟩—Cl |
| I-16 | ⟨H⟩—C₃H₇(n) | —CH₂— | CH₃ | H | bonded to form part of naphthalene ring | H | | bonded to form part of naphthalene ring | H | CH₃ | —CH₂— | ⟨H⟩—C₃H₇(n) |
| I-17 | ⟨⟩—⟨⟩—C₃H₇(n) | —CH₂— | H | CH₃ | H | H | H | CH₃ | H | H | —CH₂— | ⟨⟩—⟨⟩—C₃H₇(n) |
| I-18 | ⟨⟩—C₅H₁₁(n) | —CO— | H | H | H | H | H | H | H | H | —CO— | ⟨⟩—C₅H₁₁(n) |
| I-19 | ⟨⟩—⟨H⟩ | —CO— | H | H | bonded to form part of naphthalene ring | H | | bonded to form part of naphthalene ring | H | H | —CO— | ⟨⟩—⟨H⟩ |

In the case where the dye represented by general formula [I] alone or in combination with other dyes is mixed with an appropriate liquid-crystal compound and the resulting mixture is used as a guest-host liquid-crystal composition, the total incorporation amount of the dye(s) is usually from 0.05 to 15% by weight, preferably from 0.5 to 5% by weight, based on the weight of the liquid-crystal composition.

By mixing the yellow dichroic dye of the present invention with dyes selected from Groups (B) and (C) described above and with a liquid-crystal composition, a composition having a high order parameter throughout the whole light absorption wavelength range can be prepared.

In general formula [II], $A^1$ and $B^1$ represent a hydrogen atom or a nonionic substituent. Examples of the nonionic substituent include alkyl groups, alkoxyalkyl groups, alkoxy groups, alkoxyalkoxy groups,

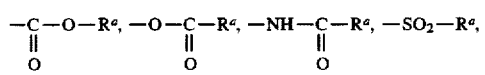

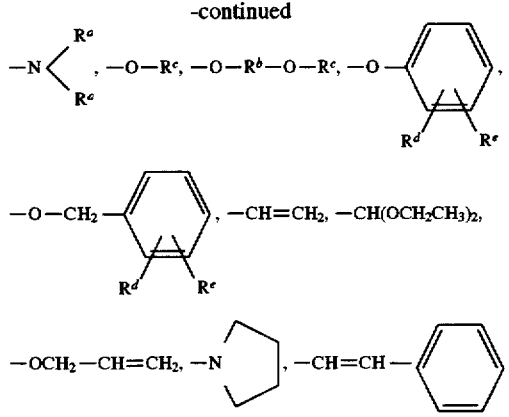

a cyano group, a nitro group, halogen atoms, —CF₃, —OCF₃, —OCF₂H, —OCF₂CF₂H, and a phenyl or cyclohexyl group substituted with an alkyl group, an alkoxyalkyl group or an alkoxy group.

Preferred examples of $A^1$ and $B^1$ include a hydrogen atom, halogen atoms, —CF₃, —OCF₃, —OCF₂H, —OCF$_2$CF$_2$H, alkyl groups, alkoxyalkyl groups, alkoxy groups,

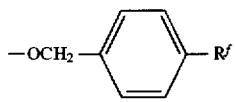

and a phenyl or cyclohexyl group substituted with an alkyl group, an alkoxyalkyl group or an alkoxy group. More preferred examples thereof include alkyl groups, alkoxyalkyl groups, alkoxy groups, and a phenyl or cyclohexyl group substituted with an alkyl group, an alkoxyalkyl group or an alkoxy group.

In the above formulae, $R^a$ represents an alkyl group; $R^b$ represents an alkylene group; $R^c$ represents an alkyl group containing one or more halogen atoms; and $R^d$ and $R^e$ represent a hydrogen atom, a halogen atom, a methoxy group, a trifluoromethyl group, an alkyl group, or a nitro group.

Specific examples thereof include $C_{1-18}$ alkyl groups such as methyl, ethyl, and linear or branched propyl, butyl, hexyl and octyl; $C_{2-18}$ alkoxyalkyl groups such as ethoxymethyl, butoxymethyl, ethoxyethyl and butoxyethyl; alkoxy groups especially those of $C_{1-18}$ such as methoxy, ethoxy, and linear or branched propoxy, butoxy and heptyloxy; alkyl-substituted phenyl groups such as butylphenyl and hexylphenyl; alkoxyalkyl-substituted phenyl groups such as ethoxymethylphenyl and butoxyethylphenyl; alkoxy-substituted phenyl groups such as propoxyphenyl and hexyloxyphenyl; alkyl-substituted cyclohexyl groups such as butylcyclohexyl and octylcyclohexyl; and alkoxy-substituted cyclohexyl groups such as pentoxycyclohexyl. Examples of the halogen atom include a fluorine atom, a bromine atom and a chlorine atom.

$R^f$ represents a hydrogen atom, a halogen atom, a methoxy group, a trifluoromethyl group or an alkyl group. Examples of the group represented by:

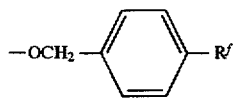

include benzyloxy; benzyloxy groups substituted with a halogen atom, such as p-chlorobenzyloxy and p-fluorobenzyloxy; a p-methoxybenzyloxy group; benzyloxy groups substituted with a linear or branched $C_{1-6}$ alkyl group, such as p-methylbenzyloxy and p-t-butylbenzyloxy; and p-trifluoromethylbenzyloxy.

$X^2$ and $X^3$ are preferably

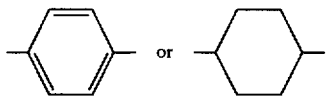

$Z^1$ to $Z^{16}$ are preferably such that $Z^3$, $Z^6$, $Z^9$, $Z^{12}$ and $Z^{13}$ to $Z^{16}$ are a hydrogen atom and $Z^1$, $Z^2$, $Z^4$, $Z^5$, $Z^7$, $Z^8$, $Z^{10}$, and $Z^{11}$ each is a hydrogen atom, a halogen atom, a methyl group or a methoxy group.

In the case where $Z^1$ and $Z^2$, $Z^4$ and $Z^5$, $Z^7$ and $Z^8$, $Z^{10}$ and $Z^{11}$, and $Z^{13}$ and $Z^{14}$ are bonded to each other to form a five-membered or larger-membered ring, this ring preferably constitutes a part of a tetralin, naphthalene or quinoline ring.

Symbols m and n each represents an integer of 0 to 2. The sum of m and n is preferably from 1 to 4. It is especially preferred that m and n each be 1 from the standpoints of synthesis and practical use.

In general formula [III], $A^2$, $A^3$, $B^2$ and $B^3$ are preferably such that $A^2$ and $B^2$ represent a hydrogen atom, a methyl group or an ethyl group and $A^3$ and $B^3$ are an alkyl group, an alkoxyalkyl group, an optionally substituted aralkyl group, or a fluoroalkyl-substituted alkyl group. Examples of $A^3$ and $B^3$ include $C_{1-8}$ alkyl groups such as methyl, ethyl, and linear or branched propyl, butyl, hexyl, octyl, dodecyl and octadecyl; $C_{2-18}$ alkoxyalkyl groups such as ethoxymethyl, butoxymethyl, ethoxyethyl and butoxyethyl; aralkyl groups optionally substituted with an alkyl group, an alkoxy group, a halogen atom or the like, such as benzyl, phenethyl, 4-butylbenzyl, 4-pentoxybenzyl and 4-chlorobenzyl; and fluoroalkyl-substituted alkyl groups such as perfluorobutylethyl and perfluorohexylethyl.

In the case where $A^2$ and $A^3$ are bonded to each other and $B^2$ and $B^3$ are bonded to each other to thereby each form a five-membered or larger-membered ring, these rings each preferably constitutes a part of a pyrrolidine, piperidine, or morpholine ring.

$Z^{21}$ to $Z^{32}$ are preferably such that $Z^{21}$, $Z^{23}$, $Z^{26}$, $Z^{29}$, $Z^{30}$ and $Z^{32}$ represent a hydrogen atom and $Z^{22}$, $Z^{24}$, $Z^{25}$, $Z^{27}$, $Z^{28}$ and $Z^{31}$ each represents a hydrogen atom, a halogen atom such as a fluorine, bromine or chlorine atom, a methyl group, or a methoxy group.

In the case where $Z^{21}$ and $Z^{22}$, $Z^{24}$ and $Z^{25}$, $Z^{27}$ and $Z^{28}$, and $Z^{30}$ and $Z^{31}$ are bonded to each other, preferably $Z^{24}$ and $Z^{25}$ are bonded to each other and $Z^{30}$ and $Z^{31}$ are bonded to each other, to thereby each form a five-membered or larger-membered membered ring, these rings each preferably constitutes a part of a tetralin, naphthalene or quinoline ring.

Furthermore, in the case where $A^2$ and $Z^{23}$, $A^3$ and $Z^{21}$, $B^2$ and $Z^{32}$, or $B^3$ and $Z^{31}$ are bonded to each other to form a five-membered or larger-membered ring, these rings each preferably constitutes a part of a julolidine or tetrahydroquinoline ring.

Symbols p and q each represents a number of 0 to 2, provided that the case where both p and q are 0 is excluded. It is especially preferred that p and q represent the same number, specifically 1 or 2, from the standpoint of practical use.

Preferred examples of $A^4$ and $B^4$ in general formula [IV] and of $B^5$ and $B^6$ in general formula [V] include alkyl groups having 1 to 10 carbon atoms such as methyl, ethyl, propyl, butyl, pentyl, hexyl, heptyl, octyl and nonyl; alkoxy groups having 1 to 10 carbon atoms and each corresponding to the respective alkyl groups described above; alkoxyalkyl groups having 2 to 12 carbon atoms such as methoxymethyl, methoxyethyl, methoxybutyl, ethoxymethyl, ethoxyethyl and ethoxybutyl; and halogen atoms such as fluorine, chlorine and bromine atoms. Although these alkyl, alkoxy and alkoxyalkyl groups may be linear or branched, they are preferably linear from the standpoint of dichroism.

Specific examples of the compounds represented by general formulae [II] to [V] are shown in Table 2.

TABLE 2
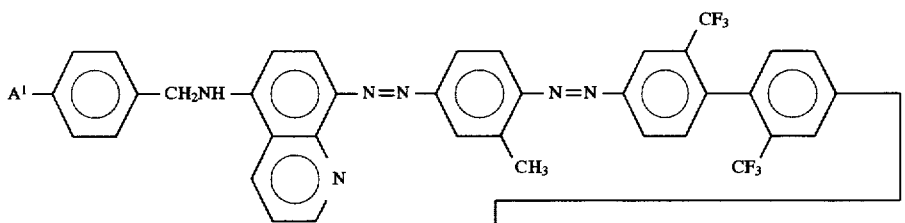
| Structural formula | $A^1$ | $B^1$ |
|---|---|---|
| II-1 | $H_5C_2O-$ | $-C_5H_{11}$ |
| II-2 | $H_5C_2O-$ | $-OC_2H_5$ |
| II-3 | $H_{11}C_5-$ | $-C_5H_{11}$ |
| II-4 | $H_9C_4O-$ | $-C_5H_{11}$ |
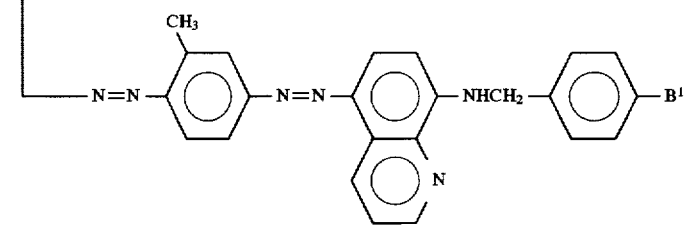
| Structural formula | $A^2$ | $A^3$ | $B^2$ | $B^3$ |
|---|---|---|---|---|
| III-1 | $H_5C_2-$ | $H_5C_2-$ | $-C_2H_5$ | $-C_2H_5$ |
| III-2 | $H_{11}C_5-$ | $H_{11}C_5-$ | $-C_5H_{11}$ | $-C_5H_{11}$ |
| III-3 | $H_9C_4-$ | $H_9C_4-$ | $-C_5H_{11}$ | $-C_5H_{11}$ |
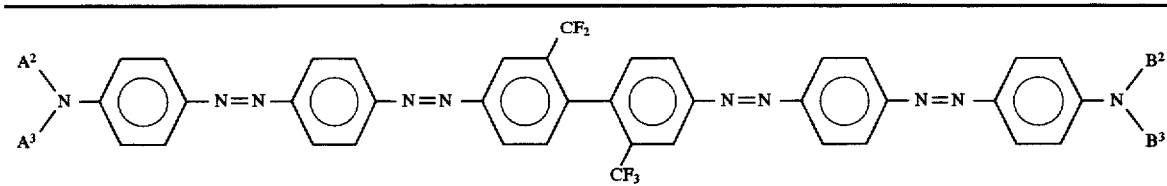
| Structural formula | $X^4$ | $A^4$ | $B^4$ |
|---|---|---|---|
| IV-1 | $-OCO-$ | 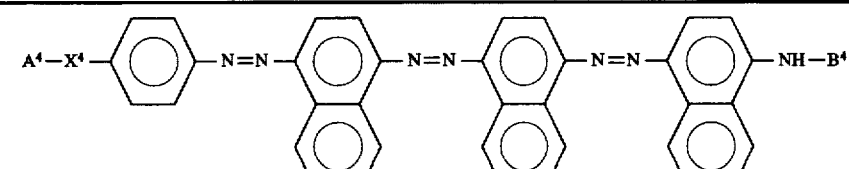 | $-C_8H_{17}$ |
| IV-2 | $-OCO-$ | 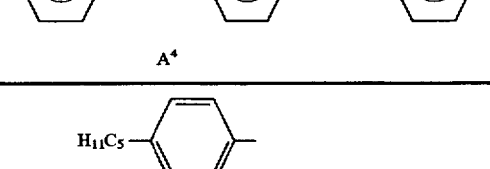 | $-C_6H_{13}$ |
| IV-3 | $-OCO-$ | 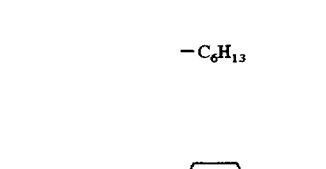 | $-CH_2\text{-cyclohexyl-}C_5H_{11}$ |
| IV-4 | $-OCO-$ | (cyclohexyl-phenyl with $H_{11}C_5$) | $-CH_2\text{-cyclohexyl-}C_5H_{11}$ |

TABLE 2-continued

| | | | |
|---|---|---|---|
| IV-5 | —OCO— | $H_{11}C_5$—⟨phenyl⟩— | —$CH_2$—⟨cyclohexyl⟩—$C_3H_7$ |
| IV-6 | —OCO— | $H_{17}C_8$—⟨phenyl⟩— | —$CH_2$—⟨cyclohexyl⟩—$C_5H_{11}$ |
| IV-7 | —OCO— | $H_{11}C_5$—⟨phenyl⟩— | —$CH_2$—⟨phenyl⟩—$C_5H_{11}$ |
| IV-8 | single bond | $C_8H_{17}(n)$ | —$CH_2$—⟨phenyl⟩—$C_5H_{11}$ |
| IV-9 | —S— | $C_2F_5$ | —$CH_2$—⟨phenyl⟩—$C_4H_9$ |

[Structure: 1-amino-4-(NH—B⁶)-anthraquinone with 2-COO—A—B⁵ substituent]

| Structural formula | B⁵ | B⁶ | A |
|---|---|---|---|
| V-1 | —⟨cyclohexyl⟩—$C_3H_7(n)$ | —⟨phenyl⟩—$C_4H_9(n)$ | ⟨phenyl⟩ |
| V-2 | —$C_4H_9$ | H | ⟨phenyl⟩ |
| V-3 | —$C_4H_9$ | —$C_4H_9$ | ⟨phenyl⟩ |
| V-4 | H | —⟨phenyl⟩—$C_4H_9(n)$ | ⟨cyclohexyl⟩ |
| V-5 | —$C_4H_9$ | —⟨phenyl⟩—$C_4H_9(n)$ | ⟨cyclohexyl⟩ |

In the guest-host liquid-crystal composition of the present invention, the use amounts of dyes of Groups (A), (B) and (C) may be appropriately decided depending on the hue to be obtained. In general, however, the use amount of dye (A) is from 0.2 to 3.0% by weight, that of dye (B) is from 0.1 to 3.0% by weight, and that of dye (C) is from 0.2 to 11% by weight, based on the weight of the liquid-crystal composition, and the total amount of these dyes is from 0.5 to 15% by weight, preferably from 0.5 to 5% by weight, based on the weight of the liquid-crystal composition.

Examples of the liquid-crystal compound for use in the liquid-crystal composition of the present invention include those shown in Table 3 below.

TABLE 3

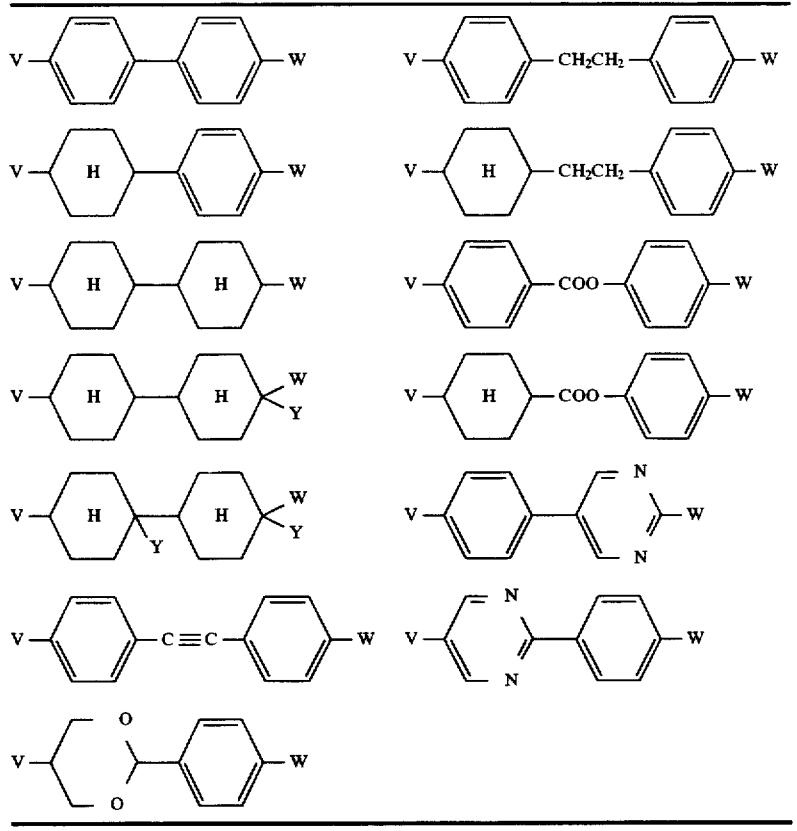

(In the formulae, V and W each represents an alkyl group, an alkoxy group, an alkoxyalkyl group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyphenylalkyl group, an alkylcyclohexylalkyl group, an alkoxyalkoxycyclohexylalkyl group, an alkoxyphenylalkyl group or an alkylcyclohexylphenylalkyl group. These alkyl chains and alkoxy chains may contain a center of optical activity. Y represents a hydrogen atom, a halogen atom or a cyano group. The phenyl or phenoxy group which can be contained in V and W may be further substituted with a cyano group or a halogen atom such as fluorine and chlorine atoms. The phenyl group contained in the above structural formulae each may be further substituted with from one to four substituents selected from halogen atoms such as fluorine and chlorine atoms and a cyano group.)

Recently, the so-called fluorinated liquid-crystal compounds, which have a substituent such as a fluorine atom or a fluorinated group, e.g., —F, —CF$_3$ and —OCF$_3$, are advantageously used in TFT LCDs (thin-film transistor liquid-crystal displays) and the like in place of conventional cyano-containing liquid-crystal compounds. The dyes of Groups (A), (B), and (C) according to the present invention are excellent in, e.g., compatibility with these fluorinated liquid-crystal compounds.

The liquid-crystal composition of the present invention may contain an optically active compound which may exhibit a liquid-crystal phase or need not exhibit it, such as, e.g., cholesteryl nonanoate. It may further contain various additive ingredients including ultraviolet absorbers and antioxidants.

By sandwiching the thus-obtained liquid-crystal composition between two electrode-possessing substrates at least one of which is transparent, a liquid-crystal display element utilizing a guest-host effect (see, for example, Shoich Matsumoto and Nagayoshi Sumida, Ekishō No Saishin Gijutsu (The Newest Liquid-Crystal Technology), Kōgyō Ch osakai, 34 (1983); and J. L. Fergason, SID 85 Digest, 68 (1983)) or the like can be constituted.

Examples of the transparent electrode substrate usually include glass plates and plates of various synthetic resins including acrylic resins, polycarbonate resins and epoxy resins. An electrode layer is formed on the substrate. The transparent electrode layer is usually made of a metal oxide such as, e.g., indium oxide, indium-tin oxide (ITO) or tin oxide. That surface of the transparent electrode layer which is to be in contact with a liquid crystal may be subjected to an alignment treatment, if desired. Examples of methods for the alignment treatment include: a method comprising applying octadecyldimethyl(3-(trimethoxysilyl)propyl) ammonium chloride, hexadecyltrimethylammonium bromide or the like to conduct vertical alignment; a method comprising applying a polyimide to conduct parallel alignment; a method comprising rubbing the surface with a cotton cloth, absorbent cotton or the like to conduct parallel alignment; and a method comprising slantwise vapor-depositing an SiO$_x$ to conduct parallel alignment. These methods may be appropriately used.

Two substrates are united via a spacer or the like in such a manner that the electrode surfaces which have undergone an alignment treatment face each other at a distance of from 1 to 50 µm, preferably from 1 to 15 µm, to fabricate an element (cell) having a space. The liquid crystal is packed into the space, and the resulting structure is sealed.

BEST MODES FOR CARRYING OUT THE INVENTION

The present invention will be explained below in detail by reference to Examples.

The present invention should not be construed as being limited to these Examples, unless the invention departs from the spirit thereof.

[EXAMPLE 1]

Into 2.2 ml of 35% hydrochloric acid and 40 ml of ice water was dissolved 1.6 g of 2,2'-ditrifluoromethylbenzidine, represented by the following structural formula.

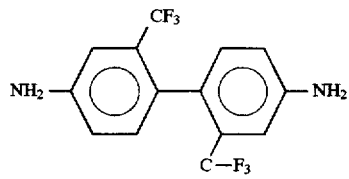

To this solution was added 0.73 g of sodium nitrite with stirring.

After the mixture was stirred at from 0° to 5° C. for 1 hour, sulfamic acid was added thereto to decompose an excess nitrite. Thus, diazo solution 1 was prepared.

On the other hand, a coupler solution was prepared by dissolving 2.3 g of sodium m-toluidinomethanesulfonate into 50 ml of water. Diazo solution 1 was gradually added thereto while stirring the coupler solution with cooling at from 0° to 5° C. and regulating the pH thereof in the range of from 4 to 7 with an aqueous sodium acetate solution. This mixture was reacted at the temperature for 2 hours.

After the reaction, the reaction product was taken out by filtration and washed with water. The cake obtained was boiled together with a 3% aqueous sodium hydroxide solution to thereby hydrolyze the cake. The yellow dye precipitated was taken out by filtration and washed with water until the washing water became neutral. Thus, a bisazo compound represented by the following structural formula was obtained.

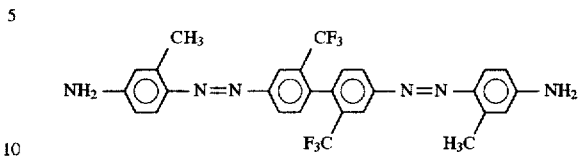

Into 40 ml of N-methylpyrrolidone was dissolved 2.7 g of the bisazo compound. Thereto was added 2.6 ml of 35% hydrochloric acid. After this mixture was cooled to from 0° to 5° C., 1.1 g of sodium nitrite dissolved in a small amount of water was added to conduct diazotization (to obtain diazo solution 2). To this diazo solution 2 was added 1.6 g of m-cresol dissolved in 10 ml of N-methylpyrrolidone. The pH of this mixture was adjusted to from 8 to 9 with an aqueous sodium hydrogen carbonate solution. Water was added at 2 hours after, and the resulting precipitate was taken out by filtration and then purified by column chromatography to obtain the tetrakisazo compound represented by the following structural formula.

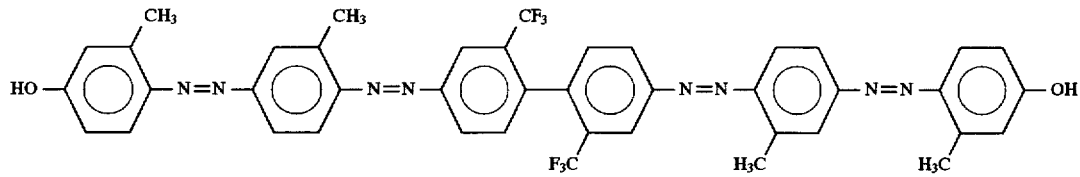

Into 20 ml of N-methylpyrrolidone was dissolved 1.0 g of the tetrakisazo compound. Thereto were added 0.5 g of potassium carbonate and 0.5 g of 4-methylbenzyl chloride as an etherifying agent. After this mixture was reacted at from 70° to 80° C. for 4 hours, methanol was added. The resulting precipitate was taken out by filtration, and the crude crystals obtained were purified by column chromatography. Thus, the objective azo dye represented by the following structural formula was obtained, which is I-1 shown in Table 1.

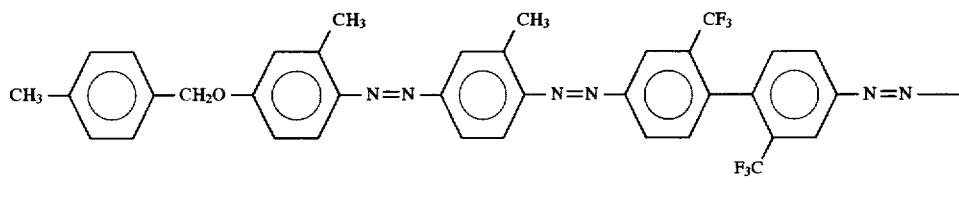

This azo dye was dissolved into the fluorinated liquid-crystal mixture commercially available under the trade name of ZLI-4792 (product of E. MERCK Co.) in a concentration

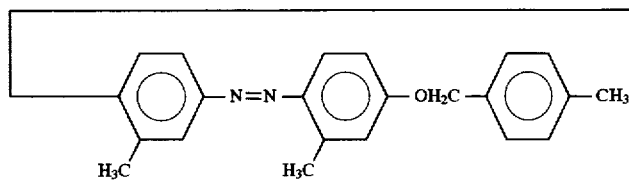

of 1% by weight to prepare a yellow guest-host liquid-crystal composition. This composition was packed into a cell having a gap width of 9 μm and comprising two glass substrates facing each other and each having a transparent electrode which had undergone a treatment for liquid-crystal parallel alignment which treatment comprises applying a polyimide resin, curing the same, and rubbing the cured resin. The cell was then sealed.

This yellow-colored cell was examined for its absorbance with respect to a linear polarized light parallel to the alignment direction (A//) of the cell and for its absorbance with respect to linear polarized light perpendicular to the alignment direction (A⊥) of the cell. The order parameter (S) at the absorption peak thereof ($\lambda_{max}$: 413 nm) was determined using the following equation.

$$S=(A//-A\perp)/(A//+2A\perp)$$

As a result, it was found that S=0.79.

[EXAMPLE 2]

The same synthesis procedure as in Example 1 was conducted, except that 4-pentylbenzyl chloride was used as an etherifying agent in place of 4-methylbenzyl chloride. Thus, the tetrakisazo dye represented by the following structural formula was obtained, which is I-2 shown in Table 1.

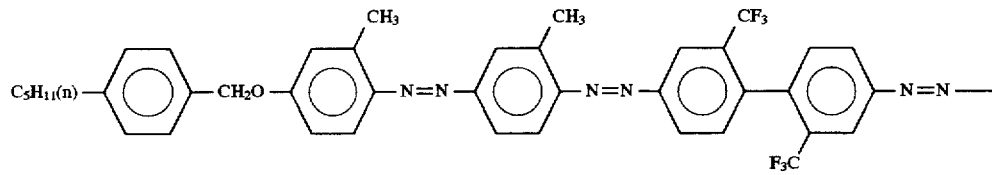

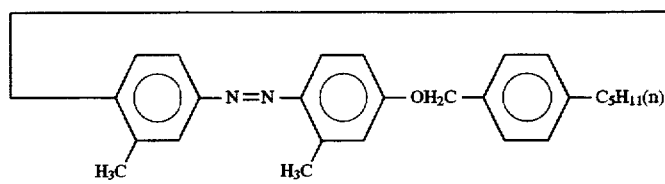

Using this dye, a yellow-colored liquid-crystal cell was fabricated in the same manner as the above. The cell thus obtained was examined for order parameter (S) in the same manner as in Example 1. As a result, it was found that S=0.80 ($\lambda_{max}$: 413 nm).

[EXAMPLE 3]

The same diazo solution 1 as in Example 1 was prepared.

On the other hand, a coupler solution was prepared by dissolving 1.8 g of α-naphthylamine hydrochloride into 30 ml of water and 60 ml of acetic acid. The diazo solution was added thereto while stirring the coupler solution with cooling at from 0° to 5° C. This mixture was gradually heated to room temperature, and reacted at the temperature for 2 hours.

After the reaction, the reaction mixture was diluted with water, and the resulting precipitate was taken out by filtration and washed with water. Thus, a bisazo compound represented by the following structural formula was obtained.

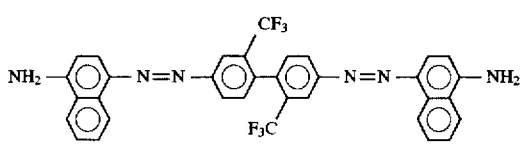

Into 40 ml of N-methylpyrrolidone was dissolved 1.3 of the bisazo compound. Thereto was added 1.1 ml of 35% hydrochloric acid. After this mixture was cooled to from 0° to 5° C., 0.3 g of sodium nitrite dissolved in a small amount of water was added to conduct diazotization (to obtain diazo solution 3). To this diazo solution 3 was added 0.4 g of phenol dissolved in 10 ml of N-methylpyrrolidone. The pH of the resulting mixture was adjusted to from 8 to 9 with an aqueous sodium hydrogen carbonate solution. Water was added at 2 hours after, and the resulting precipitate was taken out by filtration and then purified by column chromatography to obtain the tetrakisazo compound represented by the following structural formula.

Using the azo dye thus obtained, a yellow-colored liquid-crystal cell was fabricated in the same manner as in Example 1. The cell was examined for order parameter in the same manner as in Example 1. As a result, it was found that $S=0.82$ ($\lambda$max: 469 nm).

|EXAMPLE 4|

The bisazo compound obtained in Example 1 was reacted with phenol in the same manner as in Example 3 to obtain the tetrakisazo compound represented by the following structural formula.

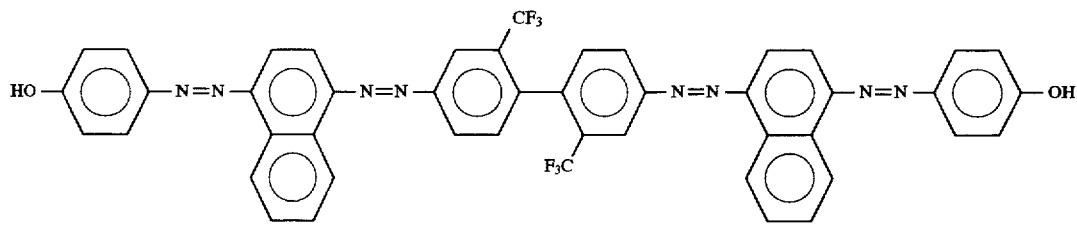

Into 20 ml of N-methylpyrrolidone was dissolved 0.20 g of the tetrakisazo compound. Thereto were added 0.13 g of potassium carbonate and 0.19 g of 4-pentylbenzyl chloride. The mixture thus obtained was reacted at from 70° to 80° C. for 4 hours, and diluted with methanol. The resulting precipitate was taken out by filtration, and the crude crystals obtained were purified by column chromatography. Thus, the azo dye represented by the following structural formula was obtained, which is I-3 shown in Table 1.

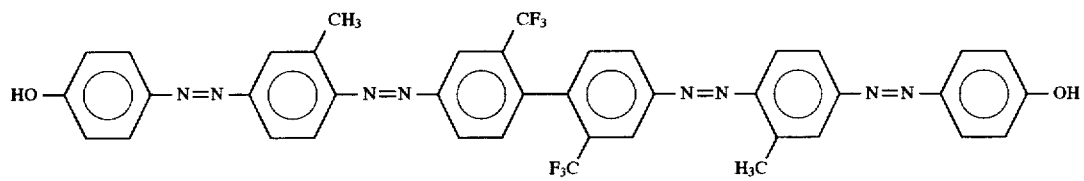

Into 20 ml of N-methylpyrrolidone was dissolved 0.77 g of the tetrakisazo compound. Thereto were added 0.45 g of 4-cyclohexylbenzoyl chloride and 0.4 g of triethylamine. This mixture was reacted at 60° C. for 2 hours. After cooling, the reaction mixture was diluted with methanol. The resulting precipitate was taken out by filtration, and the crude crystals obtained were purified by column chromatography. Thus, the azo dye represented by the following structural formula was obtained, which is I-4 shown in Table 1.

fluorinated liquid-crystal mixture commercially available under the trade name of ZLI-4792 (product of E. MERCK Co.) and the hue thereof are shown in Table 4 together with the results of Examples 1 to 4 and that of the following Comparative Example.

[Comparative Example]

The same synthesis procedure as in Example 1 was conducted, except that 2,2'-ditrifluoromethylbenzidine monodiazonium salt was used in place of 2,2'-ditrifluoromethylbenzidine. Thus, the trisazo compound represented by the following structural formula was obtained.

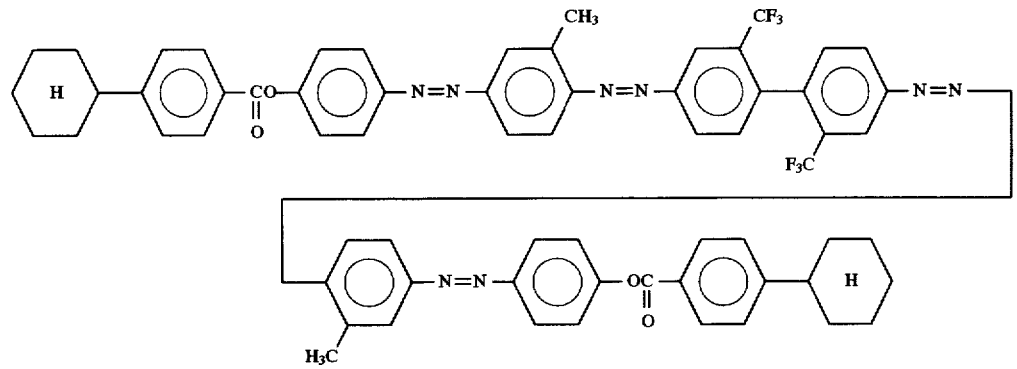

Using the azo dye thus obtained, a yellow-colored liquid-crystal cell was fabricated in the same manner as in Example 1. The cell was examined for order parameter in the same manner as in Example 1. As a result, it was found that S=0.80 ($\lambda_{max}$: 398 nm).

[EXAMPLES 5 TO 19]

Dyes I-5 to I-19, shown in Table 1, were synthesized according to the methods used in Examples 1 to 4. The order parameter (S) of each of the thus-obtained dyes in the

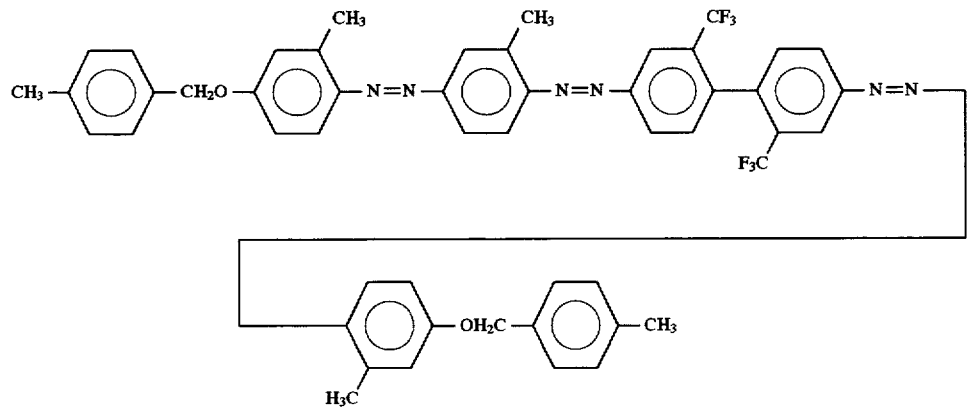

A colored liquid-crystal cell was fabricated using the trisazo compound in the same manner as in Example 1, and the order parameter thereof was measured in the same manner as in Example 1. As a result, it was found that S=0.74, showing that the dye had poor dichroism.

TABLE 4

| Example | Symbol in Table 1 | S Value | Hue |
|---|---|---|---|
| 1 | I-1 | 0.79 | yellow |
| 2 | I-2 | 0.80 | yellow |
| 3 | I-3 | 0.82 | yellowish orange |
| 4 | I-4 | 0.80 | yellow |
| 5 | I-5 | 0.80 | yellow |
| 6 | I-6 | 0.79 | yellow |
| 7 | I-7 | 0.81 | yellow |
| 8 | I-8 | 0.79 | yellow |
| 9 | I-9 | 0.80 | yellow |
| 10 | I-10 | 0.82 | yellowish orange |
| 11 | I-11 | 0.82 | yellowish orange |
| 12 | I-12 | 0.79 | yellow |
| 13 | I-13 | 0.80 | yellow |
| 14 | I-14 | 0.81 | yellow |
| 15 | I-15 | 0.80 | yellow |
| 16 | I-16 | 0.80 | yellowish orange |
| 17 | I-17 | 0.82 | yellow |
| 18 | I-18 | 0.80 | yellow |
| 19 | I-19 | 0.81 | yellowish orange |
| Comparative Example | — | 0.74 | yellow |

[EXAMPLE 20]

The dyes obtained in Examples 1 to 4 were dissolved into a substituted phenylcyclohexane liquid-crystal mixture, trade name ZLI-1132 (product of E. MERCK Co.; equivalent product with trade name TMC-1132) in the same manner as in Example 1. The order parameters (S) thereof were measured in the same manner as in Example 1. The results obtained are shown in Table 5 below.

TABLE 5

| Example No. | Order Parameter, S | $\lambda_{max}$ (nm) |
|---|---|---|
| 1 | 0.79 | 414 |
| 2 | 0.80 | 414 |
| 3 | 0.81 | 471 |
| 4 | 0.80 | 403 |

[EXAMPLE 21]

The following dichroic dyes described in Tables 1 and 2 were mixed with and dissolved into 100 g of a liquid-crystal mixture mainly composed of fluorinated compounds and commercially available under the trade name of ZLI-4792 (manufactured by E. MERCK Co.) to prepare liquid-crystal composition I.

| | | |
|---|---|---|
| | [I-3] | 0.40 g |
| | [II-1] | 0.25 g |
| | [IV-5] | 0.66 g |
| | [IV-6] | 0.38 g |

The liquid-crystal composition I thus prepared was packed into a cell comprising transparent-electrode-possessing glass plates which had undergone a treatment for homogeneous alignment comprising applying a polyimide resin, curing the same, and rubbing the cured resin, and which were disposed so that the surfaces that had undergone the alignment treatment faced each other. Thus, a liquid-crystal display element was fabricated.

The colored cell thus obtained was examined for its absorbance with respect to a linear polarized light parallel to the alignment direction (A//) of the cell and for its absorbance with respect to a linear polarized light perpendicular to the alignment direction (A⊥) of the cell. The order parameters (S values) at absorption wavelengths thereof were determined using the following equation.

$$S \text{ value}=(A//-A\perp)/(A//+2A\perp)$$

As a result, satisfactory values were obtained as shown in Table 6.

TABLE 6

| Wavelength used for measurement (nm) | 500 | 550 | 600 | 650 |
|---|---|---|---|---|
| S value | 0.81 | 0.82 | 0.82 | 0.81 |

The absorbance spectrum with respect to A// of the cell fabricated is shown in FIG. 1.

[EXAMPLE 22]

The following dichroic dyes shown in Tables 1 and 2 were mixed with and dissolved into 100 g of a liquid-crystal mixture mainly composed of fluorinated compounds and commercially available under the trade name of ZLI-4792 (manufactured by E. MERCK Co.) to prepare liquid-crystal composition II.

| | |
|---|---|
| [I-3] | 0.40 g |
| [II-1] | 0.56 g |
| [V-5] | 2.40 g |

Thus prepared liquid-crystal composition II was packed into a cell in the same manner as in Example 21 to fabricate a liquid-crystal display element.

The order parameters (S values) thereof were determined in the same manner as in Example 21. As a result, satisfactory values were obtained as shown in Table 7.

TABLE 7

| Wavelength used for measurement (nm) | 500 | 550 | 600 | 650 |
|---|---|---|---|---|
| S value | 0.82 | 0.80 | 0.75 | 0.74 |

Figure 2:
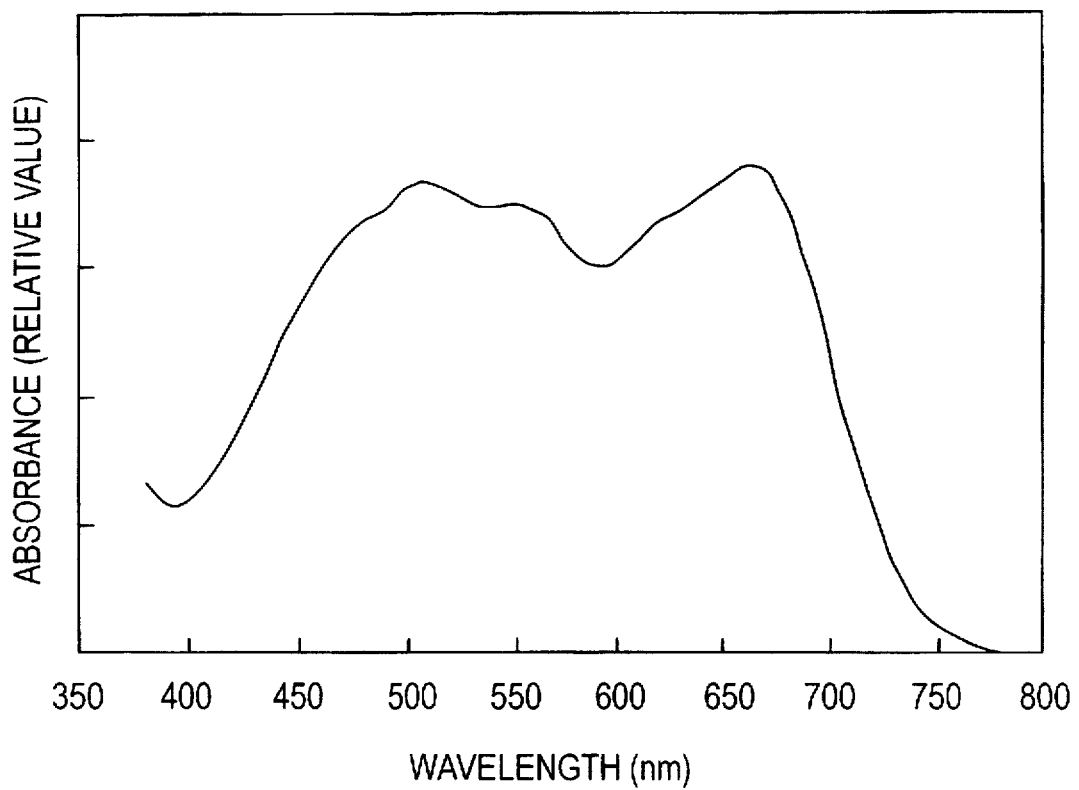
FIG. 2 is a plot of absorbance (relative value) versus wavelength (nm) for the cell fabricated in Example 22. (GH liquid-crystal composition 2).

The absorbance spectrum with respect to A// of the cell fabricated is shown in FIG. 2.

[EXAMPLE 23]

The following dichroic dyes shown in Tables 1 and 2 were mixed with and dissolved into 100 g of a liquid-crystal mixture mainly composed of fluorinated compounds and commercially available under the trade name of ZLI-4792 (manufactured by E. MERCK Co.) to prepare liquid-crystal composition III.

| |I-3| | 0.35 g |
| --- | --- |
| |II-1| | 0.20 g |
| |III-1| | 0.22 g |
| |IV-5| | 0.30 g |
| |V-5| | 1.80 g |

Thus prepared liquid-crystal composition III was packed into a cell in the same manner as in Example 21 to fabricate a liquid-crystal display element.

The order parameters (S values) thereof were determined in the same manner as in Example 21. As a result, satisfactory values were obtained as shown in Table 8.

TABLE 8

| Wavelength used for measurement (nm) | 500 | 550 | 600 | 650 |
| --- | --- | --- | --- | --- |
| S value | 0.82 | 0.82 | 0.78 | 0.76 |

Figure 3:
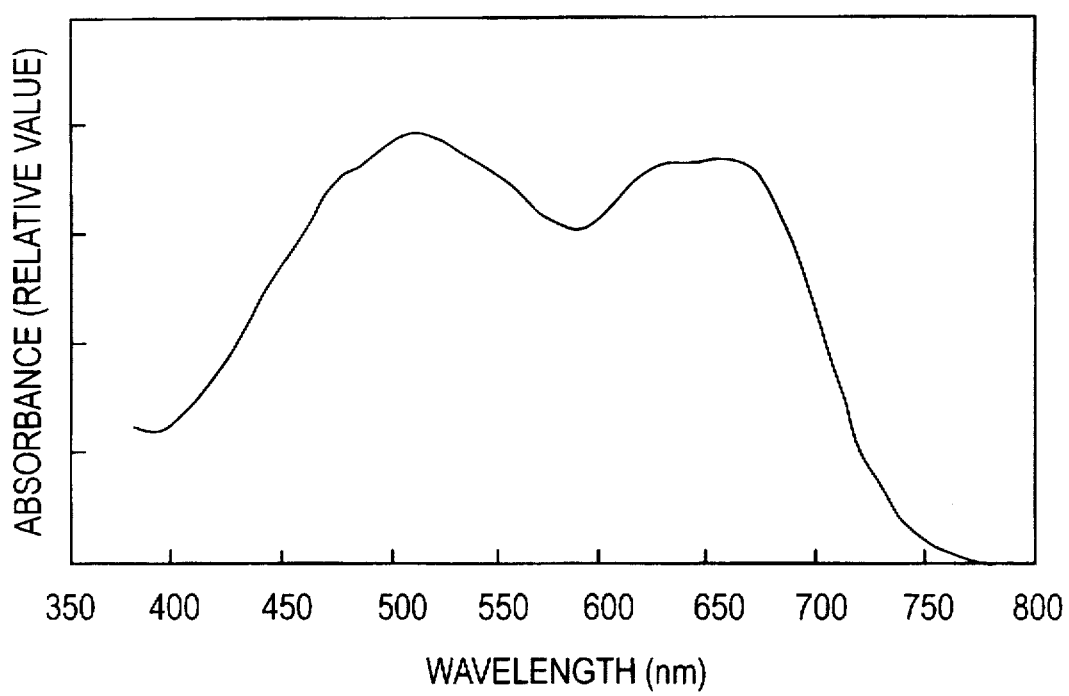

The absorbance spectrum with respect to A// of the cell fabricated is shown in FIG. 3.

POSSIBILITY OF INDUSTRIAL APPLICATION

According to the dichroic dye of the present invention, which has high dichroism and high coloring power, and to liquid-crystal composition containing the same, a display element excellent in contrast and other performances can be constituted.

We claim:

1. A dichroic azo dye characterized by having a trifluoromethyl-substituted biphenyl framework and being represented by general formula [I]:

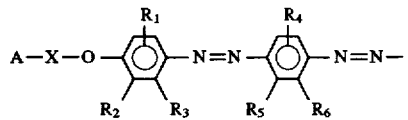

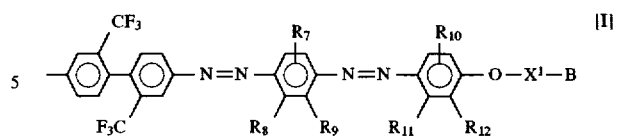

(wherein A and B each independently represents an optionally substituted alkyl group, phenyl group or cyclohexyl group; X and $X^1$ each independently represents a methylene group or a carbonyl group; and $R_1$ to $R_{12}$ each independently represents a hydrogen atom, a halogen atom, a methyl group or a methoxy group, or $R_2$ and $R_3$, $R_5$ and $R_6$, $R_8$ and $R_9$ and $R_{11}$ and $R_{12}$ may be bonded to each other to form an aliphatic, aromatic or nitrogenous aromatic ring which is a five-membered or larger-membered ring).

2. The dichroic azo dye as claimed in claim 1, characterized in that in general formula [I], A and B each independently is a phenyl or cyclohexyl group substituted with at least one substituent selected from the group consisting of alkyl groups, alkoxyalkyl groups and alkoxy groups.

3. A liquid-crystal composition characterized by comprising the dichroic dye as claimed in claim 1 and a liquid-crystal compound.

4. A liquid-crystal display element characterized by using the liquid-crystal composition as claimed in claim 3.

5. A guest-host liquid-crystal composition containing a dichroic dye, which is characterized in that the dichroic dyes comprise at least one dye selected from Group (A) shown below, at least one dye selected from Group (B) shown below, and at least one dye selected from Group (C) shown below:

Group (A)

the dichroic azo dyes as claimed in claim 1 or 2;

Group (B)

dichroic azo dyes represented by the following general formula [II] or [III]

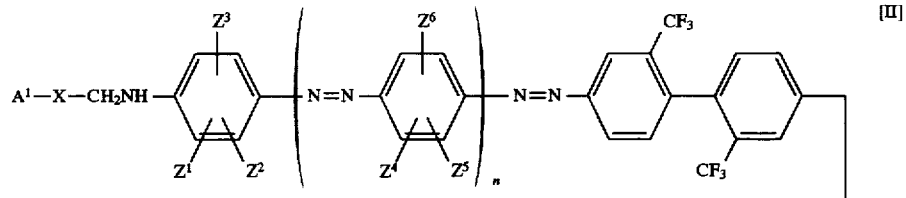

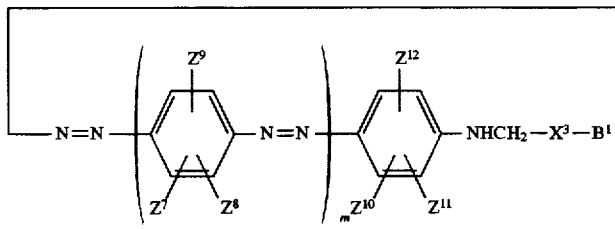

(wherein $A^1$ and $B^1$ each represents a hydrogen atom or a nonionic substituent; $X^2$ and $X^3$ each represents

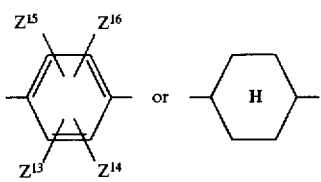

$Z^1$ to $Z^{16}$ each represents a hydrogen atom, a halogen atom, a methyl group or a methoxy group, or $Z^1$ and $Z^2$, $Z^4$ and $Z^5$, $Z^7$ and $Z^8$, $Z^{10}$ and $Z^{11}$, $Z^{13}$ and $Z_{14}$ are bonded to each other to form an aliphatic, aromatic or nitrogenous aromatic ring which is a five-membered or larger-membered ring; and m and n each represents a number 0 to 2)

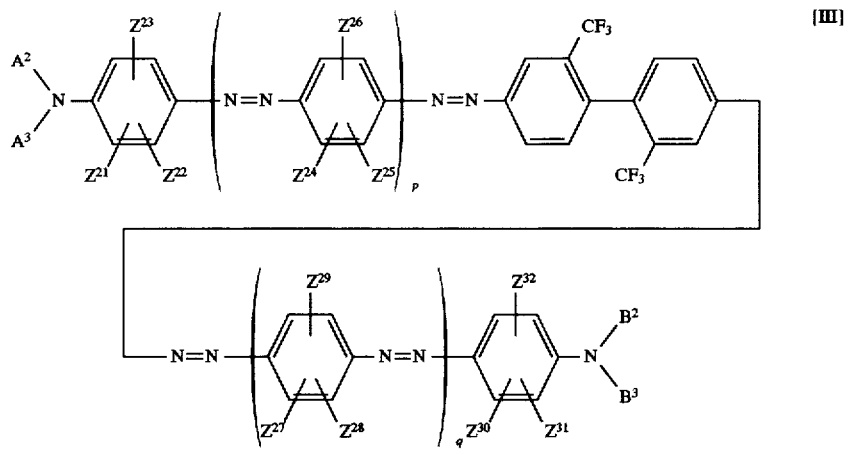

[III]

(wherein $A^2$, $A^3$, $B^2$ and $B^3$ each represents a hydrogen atom, an alkyl group, an alkoxyalkyl group, an optionally substituted aralkyl group or a fluoroalkyl-substituted alkyl group, or $A^2$ and $A^3$ are bonded to each other and $B^2$ and $B^3$ are bonded to each other to thereby each form a five-membered or larger-membered nitrogenous aliphatic ring; $Z^{21}$ to $Z^{32}$ each represents a hydrogen atom, a halogen atom, a methyl group, or a methoxy group, or $Z^{21}$ and $Z^{22}$, $Z^{24}$ and $Z^{25}$, $Z^{27}$ and $Z^{28}$, and $Z^{30}$ and $Z^{31}$ are bonded to each other to form an aliphatic, aromatic or nitrogenous aromatic ring which is a five-membered or larger-membered ring; or $A^2$ and $Z^{23}$, $A^3$ and $Z^{21}$, $B^2$ and $Z^{32}$, and $B^3$ and $Z^{31}$ are bonded to each other to form a five-membered or larger-membered nitrogenous aliphatic ring; and p and q each represents a number of 0 to 2 (provided that the case where both p and q are 0 is excluded));

Group (C)

dichroic azo dyes represented by the following general formula [IV] and dichroic anthraquinone dyes represented by the following general formula [V]

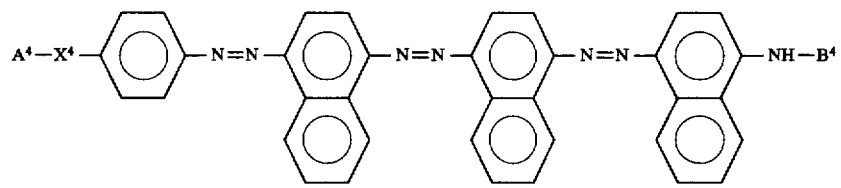

[IV]

(wherein —$X^4$— represents a single bond, —OCO— or —S—; $A^4$ represents a hydrogen atom, an alkyl or alkoxy group having 1 to 10 carbon atoms, an alkoxyalkyl group having 2 to 12 carbon atoms, a halogen atom, a haloalkyl group, a haloalkoxy group, a haloalkoxyalkyl group, or a phenyl, cyclohexylphenyl or benzyl group optionally having a substituent selected from the alkyl, alkoxy and alkoxyalkyl groups described above; and $B^4$ represents a hydrogen atom, an alkyl or alkoxy group having 1 to 10 carbon atoms, an alkoxyalkyl group having 2 to 12 carbon atoms, a halogen atom, or a cyclohexyl, phenyl, benzyl or cyclohexylmethyl group optionally having a substituent selected from these alkyl, alkoxy and alkoxyalkyl groups and halogen atoms)

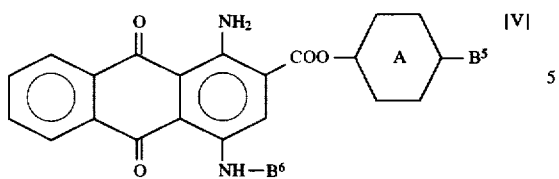

(wherein

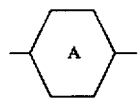

or

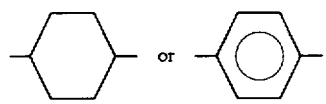

and $B^5$ and $B^6$ each independently represents a hydrogen atom, a halogen atom, a linear or branched alkyl or alkoxy group having 1 to 10 carbon atoms, a linear or branched alkoxyalkyl group having 2 to 12 carbon atoms, or a cyclohexyl or phenyl group optionally having a substituent selected from these alkyl, alkoxy and alkoxyalkyl groups).

6. The guest-host liquid-crystal composition as claimed in claim 5, characterized in that in general formula |I| for Group (A), A and B each independently is a phenyl or cyclohexyl group substituted with at least one substituent selected from the group consisting of alkyl groups, alkoxyalkyl groups and alkoxy groups.

7. A liquid-crystal display element characterized by comprising the guest-host liquid-crystal composition as claimed in claim 5 sandwiched between electrode-possessing substrates at least one of which is transparent.

* * * * *